Aug. 16, 1966 G. B. ZWETIG ETAL 3,267,282
COMPENSATED NUCLEAR RADIATION FLUID ANALYZER
Filed May 22, 1962 4 Sheets-Sheet 1

INVENTORS
GERALD B. ZWETZIG
MAURICE V. SCHERB
BY
ATTORNEY

Aug. 16, 1966    G. B. ZWETZIG ETAL    3,267,282
COMPENSATED NUCLEAR RADIATION FLUID ANALYZER
Filed May 22, 1962    4 Sheets-Sheet 2

INVENTORS
GERALD B. ZWETZIG
MAURICE V. SCHERB
BY

ATTORNEY

Aug. 16, 1966 G. B. ZWETZIG ETAL 3,267,282
COMPENSATED NUCLEAR RADIATION FLUID ANALYZER
Filed May 22, 1962 4 Sheets-Sheet 3

INVENTORS
GERALD B. ZWETZIG
MAURICE V. SCHERB
BY

ATTORNEY

United States Patent Office 3,267,282
Patented August 16, 1966

3,267,282
COMPENSATED NUCLEAR RADIATION
FLUID ANALYZER
Gerald B. Zwetzig, Canoga Park, and Maurice V. Scherb, Woodland Hills, Calif., assignors to North American Aviation, Inc.
Filed May 22, 1962, Ser. No. 196,705
1 Claim. (Cl. 250—43.5)

The present invention is directed to a method and apparatus for the radiation analysis of mixtures and more particularly to a method and apparatus for the determination of the concentration of one or more constituents of a mixture.

Prior art techniques for measuring the concentration of particular constituents in mixtures involve complicated and expensive equipment or entail time-consuming analysis not readily adaptable to continuous process streams. For example, plant quality control specifications in the petroleum industry may require continuous analysis for tetraethyl lead and/or sulfur. In order to provide a rapid routine analysis for the particular element of high atomic weight in a matrix of low atomic weight, various methods and devices have been developed. However, these devices and methods have lacked accuracy and speed and have failed to fully correct for density changes in the following stream.

Therefore, it is the object of the present invention to provide a method and apparatus particularly adapted to the rapid determination of the concentration of a high atomic weight element in a sample of fluid composed essentially of elements of relatively low atomic weight.

It is a further object of the present invention to provide a method and apparatus for compensating for changes in the density of a sample of fluid composed essentially of relatively low atomic weight elements so that the determination of the concentration of the element of high atomic weight is essentially independent of density of the fluid.

It is another object of the present invention to provide a method and apparatus for determining the concentration of sulfur in a flowing stream of crude or refined petroleum, or the concentration of additives in gasoline or other organic or low atomic weight inorganic fluid, in which two different sources of radiation are used to obtain an accurate continuous indication of concentration essentially independent of variations in fluid density.

It is a further object of the present invention to provide an apparatus for determining the concentration of an element in a fluid stream by successively exposing the stream to sources of radiation having different characteristics of attenuation and automatically calculating the concentration from the different attenuations.

It is a still further object to provide an analysis cell of simple and rugged design for use in nuclear radiation fluid analyzers.

These and other objects of the present invention will be more apparent from the following detailed description and accompanying drawings, made a part hereof, in which.

Figure 1:
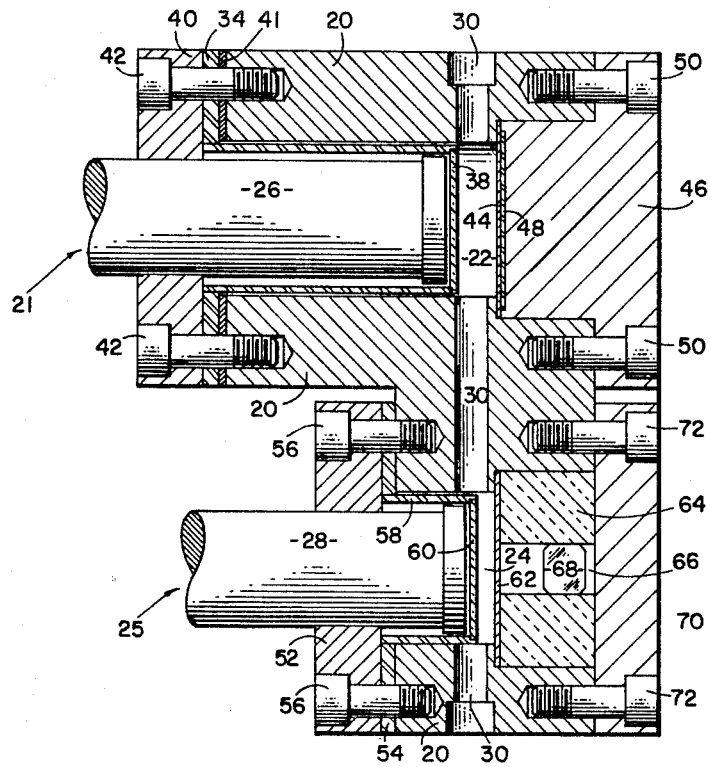
FIG. 1 is a sectional view of the preferred analyzer cell of the present invention.

Referring now to the drawings in detail, the preferred embodiment of the analyzer cell shown in FIG. 1 comprises a cell body 20 of generally rectangular configuration having a first and second chamber or channel 22 and 24 in which radiation detectors 26 and 28 are positioned. These detectors and their associated radiation sources constitute gage or analytical signal and compensator signal sources, respectively. A passage 30 which is adapted for connection to a fluid sample source, such as a process stream, passes through the body 20 normal to and connecting the chambers 22 and 24. A thimble 32, having an outer flange 34 welded to tube 36 which has its inner end sealed by a window 38 of beryllium, aluminum, or other material of low atomic weight, is inserted into the chamber 22, sealed to body 20 and protects the detector 26 from contact with the fluid. The detector 26, of any type well known in the art and responsive to the radiation source as explained hereinafter, is held within thimble 32 by retainer 40 and bolts 42, the latter also serving to maintain the outer flange 34 of thimble 32 in sealed engagement with the body 20. A shim 41 may be provided to accurately position the detector with respect to the adjacent source to provide for different thickness dimensions of the channel 22 to correspond with different concentration ranges of the material being measured as explained hereinafter.

Opposite the window 38 and adjacent the chamber 22 is a second window 44 of beryllium, aluminum, or other material of low atomic weight, sealed along its periphery to a source holder 46 which has a recessed face into which a source 48 is sealed and which preferably contains tritium, but may also contain other radioactive materials in other configurations having emanations similar to low energy X-rays (<100 kev). The source holder 46 is sealed to the body 20 by means of bolts 50 and holds the radiation source 48 in opposed relation to the face of detector 26 and to the flowing stream of fluid passing through chamber 22.

A second radiation detector 28 is located adjacent the lower chamber 24 and is mounted on a thimble retainer 52 sealed to a flange 54 and to the cell body 20 by bolts 56. A tube 58 has one end sealed to the flange 54 and the other end sealed to a window 60 similar to window 38, which prevents the fluid from chamber 24 from contacting the detector 28. Opposite the window 60 and adjacent the chamber 24 is an aluminum window 62 sealed to an aluminum source holder 64 which has an aperture 66 in which is located a source capsule 68. The holder 64 is retained in parallel relationship with the chamber 24 and detector 28 by source holder ring 70 and bolts 72.

The analytical cell adjacent chamber 22, indicated generally as 21, contains a radioactive source which emits weak X-rays of energy appropriate to the measurement, but in most cases with a mean energy less than 100 kev., either directly as in the case of $Fe^{55}$, or through the production of Bremsstrahlung, as in the case of tritium. The compensating cell adjacent chamber 24, indicated generally as 25, employs a radioactive source having a moderate energy gamma ray (0.3 mev. or greater, for example) or a strong beta particle, e.g. 2.5 mev. These sources are chosen from a variety of possibilities, the criteria being that the analytic cell source emit radiation readily attenuated by the high atomic number element to be detected and attenuated a significantly lesser amount by the fluid, while the compensating cell source emits radiation which is attenuated in proportion to the density of the fluid without any characteristic attenuation from one particular constituent or element contained in the fluid, i.e., essentially equally by both the fluid and the contaminant. The characteristics of various combinations of sources dependent upon the fluid and the particular element to be detected are well known in the art and therefore are not described in detail herein. However, it is within the purview of the present invention to utilize electrically produced radiation emitters, i.e. X-ray and beta particles and to substitute such sources for those described in the preferred embodiment.

A stable high voltage power supply 78 (see FIG. 2) of conventional design is employed to provide the polarization necessary for proper operation of the radiation detectors 26 and 28. A conventional voltage divider circuit is provided to proportion the voltage as necessary in the event the two detectors have different polarization potentials. A dual channel preamplifier 79, of conventional design, is located adjacent to the analyzer cell. This preamplifier decouples the signals from the detectors and from the polarizing potential, amplifies each signal as necessary, and reduces the source impedance to facilitate transmission of each signal to a remote instrument station. The signals are transmitted by separate conductors to the instrument station where several methods of handling the data may be employed. Before describing the operation of the various embodiments of the present invention, the theory of the measurement will be elucidated.

In the analytical channel the signal, $I_1$, given by $$I_1 = I_{10} e^{-(AW_S+B)\rho t_1} \tag{1}$$

where $A = \mu_S - B$ and $B = (R\mu_C + \mu_H)/(R+1)$ and $\mu_S$ = mass absorption coefficient of the contaminant or additive of high atomic number
$\mu_C$ = mass absorption coefficient of element of low atomic number
$\mu_H$ = mass absorption coefficient of element of low atomic number
$W_S$ = weight fraction of contaminant or additive
$R$ = ratio of the weight fraction of element of low atomic number to the weight fraction of element of low atomic number
$\rho$ = sample density
$t_1$ = sample thickness of channel 22 in analytical cell 21
$I_{10}$ = unattenuated signal from analytical channel In this treatment it is assumed that the fluid consists of two elements, both of which have a low atomic number, e.g. hydrogen and carbon. However it may consist of only one element, e.g. hydrogen, or may contain more than two elements of low atomic number, e.g. hydrogen, carbon, oxygen. The mathematical analysis is only slightly modified in the one element and three or more element cases. For the purposes of the description of the preferred embodiment and this theory, low atomic number is defined as below 10. However the important criterion is the difference between the atomic weights of the elements and not their absolute weight or number.

Similarly, in the compensating channel, the signal, $I_2$, is $$I_2 = I_{20} e^{-\mu_2 \rho t_2} \tag{2}$$

where $\mu_2$ = the effective mass absorption coefficient for the nuclear radiation employed in the compensating channel (insensitive to elemental composition)
$t_2$ = sample thickness in the channel 24 of compensating cell 25
$I_{20}$ = unattenuated signal in compensating channel The ratio signal, $S_R$, is then obtained by dividing $I_2$ by $I_1$, yielding $$S_R = \frac{I_2}{I_1} \frac{I_{20}}{I_{10}} e^{-\rho(\mu_2 t_2 - [AW_S+B] t_1)} \tag{3}$$

which may be rearranged as follows:

$$S_R = \frac{I_{20}}{I_{10}} e^{AW_S \rho t_1} \cdot e^{-\rho(\mu_2 t_2 - B t_1)} \tag{4}$$

By proper selection of $t_1$ and $t_2$, the quantity $(\mu_2 t_2 - B t_1)$ in the second factor of Equation 4 may be made equal to zero so that the ratio signal, $S_R$, then becomes $$S_R = \frac{I_{20}}{I_{10}} e^{AW_S \rho t_1} \tag{5}$$

The advantage of this ratio system as compared to a single channel system uncompensated for density variations [as represented by Equation 1] is easily demonstrated by means of a numerical example.

The important criterion is the Gage Factor, which is defined as the percent change in the signal per percent change in the variable of interest. In the case of a single channel uncompensated system [Equation 1], the Gage Factor with respect to density is:

$$G.F._\rho = (\delta I_1/I_1)/(\delta \rho/\rho) = -(AW_S+B)\rho t_1 \tag{6}$$

And the Gage Factor with respect to $W_S$ is $$G.F._{W_S} = (\delta I_1/I_1)/(\delta W_S/W_S) = -AW_S \rho t_1 \tag{7}$$

In a typical example involved in the determination of sulfur in a hydrocarbon, the quantities in Equations 6 and 7 may have values as follows: $A = 50$ cm.$^2$/g.;

$$W_S = 2 \times 10^{-3}$$

$B = 3$ cm.$^2$/g; $\rho = 1$ g./cm.$^3$; and $t_1 = 1$ cm. Accordingly, $$G.F._\rho \approx -3.1$$

and $$G.F._{W_S} \approx -0.1$$

Thus, the single channel system is approximately 30 times more sensitive to density changes than it is to changes in sulfur concentration.

On the other hand, employing the compensated ratio system represented by Equation 5

$$G.F._\rho = AW_S \rho t_1$$

and $$G.F._{W_S} = AW_S \rho t_1$$

On the same basis as above, the Gage Factor in each case here is 0.1. Thus, in a given sample stream density variations would generally be limited to a few percent while the additive or contaminant concentration might be monitored over a wide range. For example, a density variation from 1.0 to 1.1 would be 10 percent and in practice would generally be considered large. However a change in contaminant concentration from 0.20 to 0.22 percent would also be a 10 percent change, but generally this change would be considered small.

From the above example it is seen that inasmuch as the two gage factors are comparable, it is desirable that the value of $W_S$ be substantially smaller than the value of $\rho$, i.e. that the percentage changes in $W_S$ are large compared with percentage changes in $\rho$. In practical applications, this criterion is met by defining $$W_S = W_S^* + E$$

where $W_S^*$ = a design reference contaminant concentration
$E$ = deviation from the reference ($\pm$).

Substituting in Equation 4

$$S_R = \frac{I_{20}}{I_{10}} e^{A(W_S^* + E)\rho t_1} \cdot e^{-\rho(\mu_2 t_2 - B t_1)} \tag{8}$$

and rearranging $$S_R = \frac{I_{20}}{I_{10}} e^{AE\rho t_1} \cdot e^{-\rho(\mu_2 t_2 - (B + AW_S^*) t_1)} \tag{9}$$

Thus, for monitoring contaminant variations about a design reference contaminant level ($W_S^*$), one may vary $t_1$ so that the bracketed quantity in Equation 9 is equal to zero, with the result that $$S_R = \frac{I_{20}}{I_{10}} e^{AE\rho t_1} \qquad (10)$$

Figure 5:
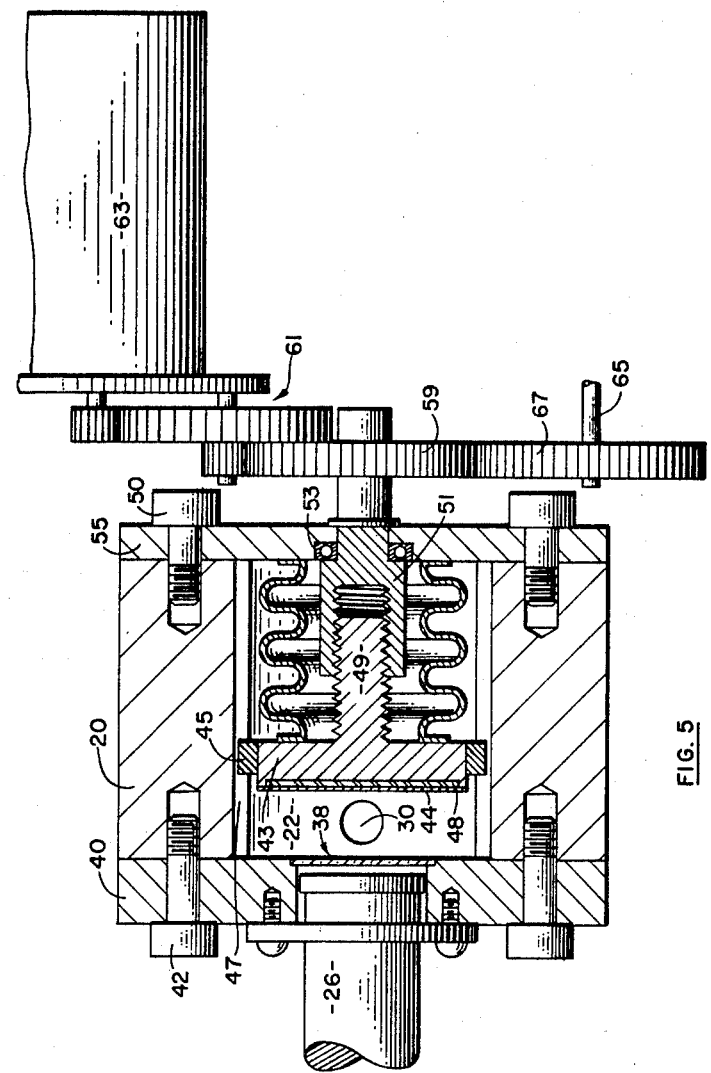
FIG. 5 is a sectional view of a modification of the analyzer cell of the present invention.

Accordingly, E may be made necessarily small with respect to $\rho$ for any value of $W_S$. It is for the purpose of varying $t_1$ to correspond with different design reference contaminant concentrations ($W_S^*$) that the shim 41 is provided in the analytical section of the analyzer cell 20, FIG. 1, and the embodiment of FIG. 5 is provided as described hereinafter.

Based on the foregoing theory, a number of instrument systems may be utilized with the Compensated Nuclear Radiation Fluid Analyzer of the present invention to obtain an indication of the concentration of the high atomic number element which is corrected for density changes in the fluid.

In the ratio recorder system, a modified potentiometric recorder indicator or controller is employed to compute and display or record the ratio signal. Such modified instruments are well known in the art, the modification consisting of means for varying the value of the voltage across the resistance element in accordance with the value of one of the input signals. Such instruments have numerator and denominator inputs and may in addition have a third input for operation of the instrument in a conventional manner.

Figure 2:
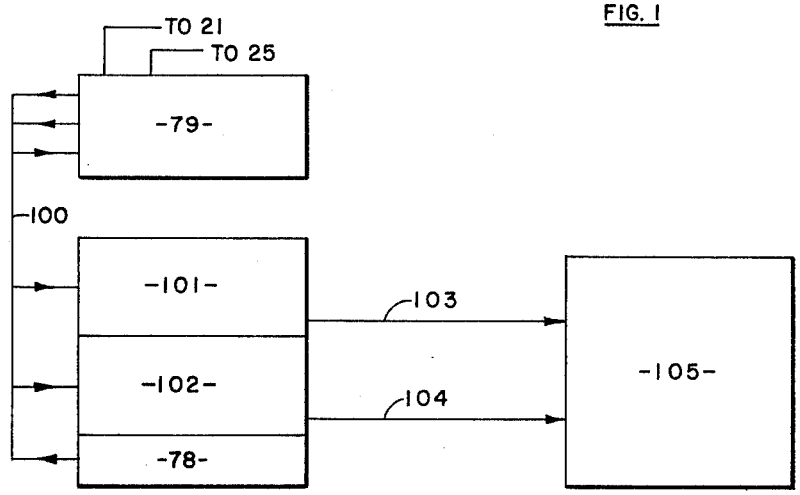
FIG. 2 is a schematic drawing of a dual count-rate-meter, ratio-recorder system for use with the analyzer cell of FIG. 1.

An example of the use of such an instrument is shown in FIG. 2. In this case the separate signals from the analytical and compensating channels are connected by shielded multiconductor lead 100 to separate rate meter or electrometer circuits 101 and 102, and the resulting outputs 103 and 104 are then connected directly to the denominator and numerator inputs of the ratio recorder, ratio indicator, or ratio controller 105. The scale of the instrument 105 may have a special calibration in units of weight percent of contaminant or additive as computed from Equations 5 and/or 10. An additional output may be taken from the rate meter or electrometer and connected to the normal input of the ratio instrument. Then by operation of a selected switch (not shown) and incorporation of a density scale on the ratio instrument, density as well as contaminant concentration can be read using this apparatus. In any density application, provision must be made for correcting for radioactive decay of the compensating channel source when such a source is employed. One of several possible methods is the use of a trimming potentiometer on the density output signal of the compensating channel rate meter or electrometer. This "density" output would differ from the "numerator" output on the compensating channel. Also, correction for combined radioactive decay of the analytical channel and compensating channel sources, if sources are used, will be made by periodically physically adjusting the position or filtering of one of the sources as necessary to retain a constant value of ($I_{20}/I_{10}$).

Figure 3:
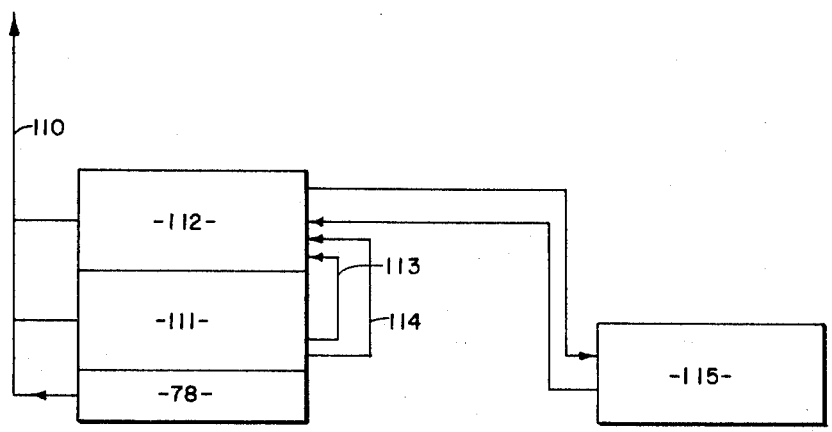
FIG. 3 is a schematic of another recorder system utilizing a digital circuit for continuously computing and recording the concentration for use with the analyzer cells of the present invention.

Another system, i.e. digital ratio system, is shown in FIG. 3. Pulse signals from the gage and compensating channels are continuously fed through shielded multiconductor cable 110 to the dual preset counter 111 and gated digital 112, respectively. The dual preset counter 111 contains provisions for selecting two numbers within the range of the instrument and obtaining a pulse output signal when each of these numbers is registered. If these two numbers are designated as "A" and "B," where "B" is greater than "A," the operation of the system may be described as follows: "B" signal is connected as at 113 to start the gated digital counter and "A" signal is connected as at 114 to stop the gated digital counter. Assume that initially the gated digital counter is "off" and reset and that the number registered on the dual preset digital counter 111 is between "A" and "B." When a number corresponding to the "B" value is registered on the dual preset counter 111, the gated digital counter 112 is immediately gated "on" by the output pulse from the dual preset counter 111. Simultaneously, by means of internal circuitry within the dual preset counter, the dual preset counter 111 is reset to zero; however, the registration of counts is only momentarily interrupted. The dual preset counter 111 and the gated digital counter 112, both starting from zero, now register counts in accordance with the signals from the analytical and compensating channels, respectively. This continues until a number of counts is registered on the dual preset counter corresponding with the preset value "A." When this value is registered, a "stop" pulse is transmitted through lead 114 to the gated digital scaler 112 which gates off this unit. This stop signal is relayed to the digital recorder 115 (printer), which interrogates the gated digital scaler as to the number of counts accumulated and prints out this value. During this process the printer imposes an "inhibit" signal on the gated digital scaler 112 to prevent its counting should it be gated "on" during this period. Upon completion of interrogation the gated digital scaler 112 is reset to zero. Meanwhile, during this interval the dual preset counter 111 has uninterruptedly continued to register counts and continues to do so until a number of counts equal to the preset value "B" is accumulated. At that point the cycle is completed and automatically starts again.

In this system the number of counts accumulated on the gated digital counter 112, say N counts, is obtained in a time interval equal to that required to accumulate "A" counts on the dual preset counter. Thus, "N" is proportional to the counting rate in the compensating channel, and "A" is proportional to the counting rate in the analytical channel. Thus, if A is selected as 1,000; 10,000; 100,000, etc., the value "N" with proper placement of the decimal point is the numerical ratio of the counting rates in the two channels. And by the functional relationship expressed by Equations 5 and/or 10 this ratio is then a measure of the contaminant or additive concentration, which is independent of first order density changes in the fluid.

Figure 4:
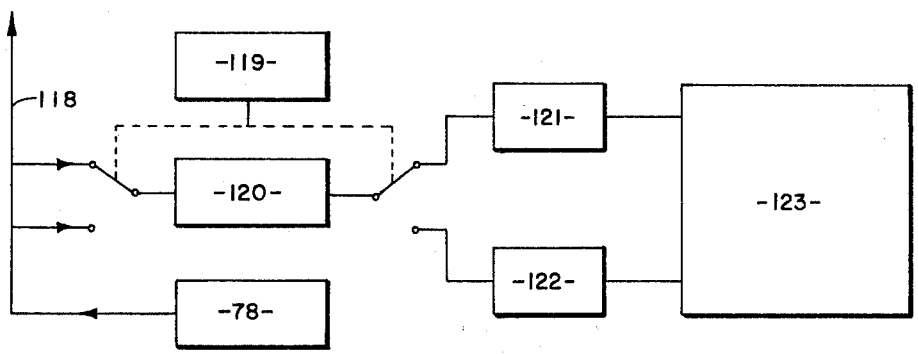
FIG. 4 is a schematic of another recorder system utilizing a commutator system for use with the analyzer cells of the present invention.

Another instrumentation method for utilizing the data from the fluid analyzer of FIG. 1 is shown in FIG. 4. In this system a single count rate meter or electrometer 120 is employed and the signals carried from each of the two detector channels by the multiconductor cable 118 are alternately applied to the input of this instrument by means of a commutator 119, said commutator simultaneously directing the corresponding output signal to the respective storage or integrating circuit 121, 122. The rate of commutation may vary from many times a second to once every few seconds. The object of this method is to compensate for the different degrees of electronic drift which occur when two instruments are employed. In this system, by using a single instrument, drift effects are equally distributed between the two data channels and thereby are eliminated in taking the ratio of the two integrated signals.

Commutation can be provided by a number of devices, including a recycling timer, an electronic chopper, or various electronic oscillator switching circuits. Of these, the recycling timer is a mechanism which provides good long- and short-term stability in proportioning the signal input. This is a commercially available device consisting of a synchronous electric motor driving a cam that actuates a switch in accordance with the cam profile. In the present device the cam is contoured so that the switch occupies each of its two positions 50 percent of the time.

Two identical storage or integrating circuits receive the respective commutated outputs from the count rate meter. These circuits are conventional resistance-capacitance networks with or without a D.C. amplifier. To minimize ripple the time constant of these networks is selected so that it is long compared with the duration of the input signal. A suitable voltage divider output is provided to furnish current and voltage in the proper magnitude to a potentiometric recorder indicator or controller modified so as to display the ratio of the two signals. As in the preceding system, density read-out may be provided by means of a suitable resistance network at the output of the compensating channel.

A modification of the preferred embodiment of the analyzer cell is shown in FIG. 5 in which one of the detector-source combinations of FIG. 1 is replaced by a movable source. In the specific application described herein, either the compensating cell 25 or the analytical cell 21 of FIG. 1 may be replaced by the modification of FIG. 5. However, in order to minimize changes in the character of the radiation spectrum, the movable source modification of FIG. 5 is preferably substituted for the analytical channel 22. This modification includes a source holder 43 having guide lugs 45 which move in slidable engagement within guide slots 47 in the body 20. Connected to the surface of holder 43 opposite the source 48 is a screw 49 which is threadedly connected to a rotatable shaft member 51, mounted for rotation by bearing 53 in cover plate 55 and having a portion 57 extending through the plate 55 on which a gear 59 is fixed. The gear 59 is driven through a gear train 61 by servo motor 63, and drives an output shaft 65 through connecting gear 67.

In this cell arrangement the sample thickness, $t_1$, is variable by means of a bellows seal and a low-friction translational drive, whereas in FIG. 1 this thickness could be varied only by replacing shim 41 with shims of different thickness. Adjustment of $t_1$ is effected through a gear train driven by a servo motor responding to an error signal.

Figure 6:
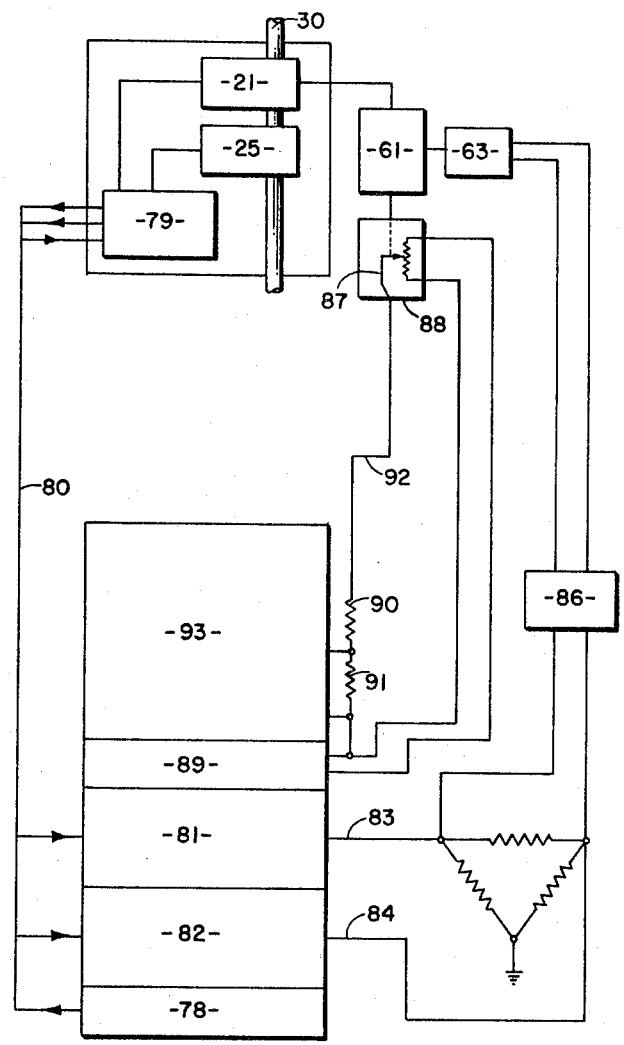
FIG. 6 is a schematic of a servo adjusted compensated fluid analyzer for use with the analyzer cell embodiment of FIG. 5.

As may be seen by inspection of Equation 3, the requirement for exact density compensation in a two-channel system is that $(AW_S+B)t_1=\mu_2 t_2$, where $AW_S+B$ is the mass absorption coefficient in the sample analytical channel, $\mu_2$ is the mass absorption coefficient in the density compensating channel, and $t_1$ and $t_2$ are the respective sample thicknesses. However, as the concentration of an impurity or additive varies, the value of $AW_S+B$ similarly varies so that completely accurate compensation, i.e. obtaining an indication completely independent of density changes in the fluid, can be achieved at only a unique value of impurity or additive concentration. This deficiency is corrected by varying the value of $t_1$ in accordance with variation in $AW_S+B$, so as to maintain $(AW_S+B)t_1=\mu_2 t_2$. This is accomplished by connecting the output of each channel in a null-balance circuit. Any error signal adjusts $t_1$ to maintain a null. The concentration of the impurity or additive of high atomic number is then related to the value of $t_1$ necessary to produce a null indication. The value of $t_1$ is relayed to the control console by any of a number of means. In the particular system shown in FIG. 6, a high voltage supply 78 is connected through a dual channel preamplifier 79 to the detectors 26 and 28 of the gage channel and compensation channel. The signals in these channels are then decoupled from the high voltage in the preamplifier 79. The dual channel preamplifier 79 then separately amplifies each of the signals as necessary for transmission by shielded cable 80 to the instrument console. Here each of the signals is passed into a separate count-rate meter 81 and 82, respectively. The outputs 83 and 84 of these two meters are then supplied to a network substantially as shown in FIG. 6. A difference in voltage occurring across resistor 85 serves as a signal (amplified by amplifier 86) to the servo motor 63 (see FIG. 3 also) which adjusts $t_1$ to produce a null condition. One means for indicating the value of $t_1$ is shown. In this case the slider 87 of a multi-turn potentiometer 88 is connected to the servo gear train. With a well regulated voltage source 89 connected to each end of the potentiometer, the partial voltage between the slider 87 and one end of the potentiometer 88 can be related to the sample thickness $t_1$ and hence to $AW_S+B$ and thence to the concentration of additive or impurity, $W_S$. This voltage signal when suitably attenuated by resistors 90 and 91 is connected, as at 92, to a conventional indicator or recorder 93.

A modification of the instrumentation system to be used with the servo-adjusted analyzer described above consists of substituting a commutator and a single count-rate meter or electrometer for the two rate meters 81 and 82. This modification presents the same advantages to this system with regard to improved stability as previously described for the analyzer shown in FIG. 1.

Another variation of this system is to maintain $t_1$ constant and to vary $t_2$. In general this latter variation is unattractive, since changes in $W_S$ will cause a marked change in the radiation spectrum in the analytical channel. On the other hand, by varying $t_1$ and thereby maintaining the total absorption approximately constant, the spectrum in the analytical channel is maintained approximately constant.

Where it is desired that control functions be incorporated in conjunction with the digital form shown in FIG. 3, the digital recorder may be supplemented or replaced by a number of conventional devices such as digital-to-analog conversion and storage devices for analog control, or tape and/or card punches, magnetic tape recording devices and/or core memory devices for digital or digital computer control.

Although the preferred embodiment and modifications thereto are described herein with reference to a liquid stream of low atomic weight, e.g. gasoline, in which the concentration of one element, sulfur, is to be analyzed, the present invention is not limited to specific fluids or elements. It is readily apparent that several different elements may be measured by providing additional cells with sources of radiation attenuated by any one or a group of the particular elements. Therefore the present invention is limited only to applications where the radiation attenuating characteristics of the element whose concentration is to be determined are different than the fluid in which this element is present, as specified in the appended claim.

What is claimed is:

A device for measuring the concentration of at least one element of high atomic number in a fluid of relatively low atomic number comprising a first and second source of radiation and a first and second radiation detector, said detectors being spaced from said sources, respectively, to form two channels of finite but different thickness; means for changing the thickness of one of said channels, said means for changing channel thickness including means for automatically changing the thickness of one channel in response to changes in the output of one of said detectors so as to maintain a predetermined relationship between the thicknesses of said two channels; means for passing a fluid through said channels, said radiation from said first source being readily attenuated by said high atomic number element, said radiation from said second source being essentially equally attenuated by said fluid and said high atomic number element, each of said detectors having an output proportional to the quantity of radiation passing through said fluid from its respective source; means responsive to said outputs for generating a signal indicating the concentration of said high atomic numbered element corrected for changes in density of said fluid; said fluid consisting primarily of two low atomic number elements; said predetermined relationship being defined as $$\mu_2 t_2 - Bt_1 = 0$$

where $\mu_2$=effective mass absorption coefficient for the radiation of said second source
$t_2$=thickness of one channel
$t_1$=thickness of the other channel and $$B=(R\mu_C+\mu_H)/(R+1)$$

where $R=$ ratio of the weight fraction of elements of low atomic number, and $\mu_C$ and $\mu_H$ are the mass absorption coefficients of the elements of said two low atomic weight elements of said fluid.

References Cited by the Examiner

UNITED STATES PATENTS

| | | | |
|---|---|---|---|
| 2,452,122 | 10/1948 | Gumaer | 250—43.5 |
| 2,649,011 | 8/1953 | Black | 250—43.5 X |
| 2,735,944 | 2/1956 | Greer | 250—43.5 |
| 2,761,067 | 8/1956 | Troy | 250—43.5 |
| 2,761,976 | 9/1956 | Obermaier et al. | 250—43.5 |
| 2,763,790 | 9/1956 | Ohmart | 250—43.5 |
| 2,805,339 | 9/1957 | Laird | 250—43.5 |

FOREIGN PATENTS 1,118,990  12/1961  Germany.

RALPH G. NILSON, *Primary Examiner*.

HENRY S. MILLER, GUY E. MATTHEWS, WILLIAM F. LINDQUIST, *Assistant Examiners*.